United States Patent
Harris

(10) Patent No.: US 11,651,261 B2
(45) Date of Patent: May 16, 2023

(54) HYPERDIMENSIONAL SIMULTANEOUS BELIEF FUSION USING TENSORS

(71) Applicant: The Boeing Company, Chicago, IL (US)

(72) Inventor: Daniel E. Harris, Huntsville, AL (US)

(73) Assignee: THE BOEING COMPANY, Chicago, IL (US)

( * ) Notice: Subject to any disclaimer, the term of this patent is extended or adjusted under 35 U.S.C. 154(b) by 653 days.

(21) Appl. No.: 16/667,722

(22) Filed: Oct. 29, 2019

(65) Prior Publication Data

US 2021/0125092 A1 Apr. 29, 2021

(51) Int. Cl.
G06N 20/00 (2019.01)
G06N 5/02 (2023.01)
G06N 7/01 (2023.01)

(52) U.S. Cl.
CPC .............. *G06N 7/01* (2023.01); *G06N 5/027* (2013.01); *G06N 20/00* (2019.01)

(58) Field of Classification Search
CPC .............. G06F 17/16; G06F 16/1744; G06F 18/2411; B60W 50/0097; G01V 1/301
See application file for complete search history.

(56) References Cited

U.S. PATENT DOCUMENTS

| | | | |
|---|---|---|---|
| 2005/0171700 A1* | 8/2005 | Dean | G01V 1/301 702/16 |
| 2012/0179635 A1* | 7/2012 | Vasudevan | G06T 7/521 703/2 |
| 2016/0232175 A1* | 8/2016 | Zhou | G06F 16/1744 |
| 2017/0053398 A1* | 2/2017 | Mahoor | G06F 18/2411 |
| 2017/0168991 A1* | 6/2017 | Baskaran | G06F 17/16 |
| 2018/0292834 A1* | 10/2018 | Kindo | B60W 50/0097 |
| 2018/0301223 A1* | 10/2018 | Alter | G16H 50/30 |

OTHER PUBLICATIONS

Hunyadi et al Tensor Decomposition and data fusing in epileptic electroencephalograph and functional magnetic resonance imaging data (2016 ) WIREs Data Mining and Knowledge Discovery published by John Wiley & Sons, LTD, vol. 7 Jan./Feb. 2017 (pp. 1-15) (Year: 2016).*

Suteretal Interactive Multiscale Tensor Reconstruction for Multiresolution vol. Visualization, ( Dec. 2011) IEEE Transaction on Visualization and Computer Graphics , vol. 17, No. 12 (pp. 2135-2143) (Year: 2011).*

Kolda et al Scalable Tensor Decompositions For Multi-Aspect Data Mining (2008)., IEEE International Conference on Data Mining , 2008 Eighth pages (363-372) (Year: 2008).*

Dong et al., "A New Combination Rule in Evidence Theory," Engineering Letters, 24:3, EL_24_3_07, Advance online publication on Aug. 27, 2016, 6 pages.

* cited by examiner

*Primary Examiner* — Saba Dagnew
(74) *Attorney, Agent, or Firm* — MH2 Technology Law Group LLP

(57) ABSTRACT

A computer-implemented method includes receiving a plurality of expert datasets representing computer-generated beliefs; generating respective expert tensors for each expert dataset; fusing each of the respective expert tensors into a final result tensor, wherein the final result tensor represents the simultaneous fusing of the plurality of expert datasets; and storing or outputting the final result for use in an application.

25 Claims, 5 Drawing Sheets

HYPERDIMENSIONAL SIMULTANEOUS BELIEF FUSION USING TENSORS

STATEMENT REGARDING FEDERALLY SPONSORED RESEARCH OR DEVELOPMENT

This invention was made with Government support under Contract No. HQ 0147-12-D-0003 awarded by the Department of Defense. The Government has certain rights in this invention.

BACKGROUND

The theory of belief functions, also referred to as evidence theory or Dempster-Shafer theory (DST), is a general framework for reasoning with uncertainty, with understood connections to other frameworks such as probability, possibility and imprecise probability theories. In the context of statistical inference, DST may include a general framework for modeling epistemic uncertainty, or a mathematical theory of evidence. DST allows one to combine (fuse) evidence or belief data from different sources (e.g. computer-generated data sources) and arrive at a degree of belief (represented by a mathematical object called a belief function) that takes into account all of the available evidence.

One example application of belief function theory is in computer-based object identification or classification. For example, different belief data sets from different sources (e.g., computer-based object recognition sources) may provide different beliefs or estimates as to the identification of an object. The different belief data sets may be fused so as to consider the beliefs of all the data sources in order to more accurately estimate or identify the object.

The fusing of evidence or belief data using DST may involve Rules of Combination (RoC), which is a sequential or ordered process. Smet's RoC is a technique in which conflicts from belief fusion results are absorbed into an empty set. Yager's RoC is a technique in which conflicts from belief fusion results are absorbed into a full frame set. Dubois and Prade's (DP) RoC is a technique in which conflicts from belief fusion results are absorbed into combined conflicting sets.

SUMMARY

In one example aspect, a computer-implemented method includes receiving a plurality of expert datasets representing computer-generated beliefs; generating respective expert tensors for each expert dataset; simultaneously fusing each of the respective expert tensors into a final result tensor, wherein the final result tensor represents a fusing of the plurality of expert datasets; and storing or outputting the final result tensor for use in an application.

In another example aspect a computer program product includes a computer readable storage medium having program instructions embodied therewith. The program instructions are executable by a computing device to cause the computing device to perform operations including: receiving a plurality of expert datasets representing computer-generated beliefs; generating respective expert tensors for each expert dataset; simultaneously fusing each of the respective expert tensors into a final result tensor, wherein the final result tensor represents a fusing of the plurality of expert datasets; and storing or outputting the final result tensor for use in an application.

In another example aspect, a system includes a processor, a computer readable memory, a non-transitory computer readable storage medium associated with a computing device, and program instructions executable by the computing device to cause the computing device to perform operations including receiving a plurality of expert datasets representing computer-generated beliefs; generating respective expert tensors for each expert dataset; simultaneously fusing each of the respective expert tensors into a final result tensor, wherein the final result tensor represents a fusing of the plurality of expert datasets; and storing or outputting the final result tensor for use in an application.

DETAILED DESCRIPTION

Figure 1:
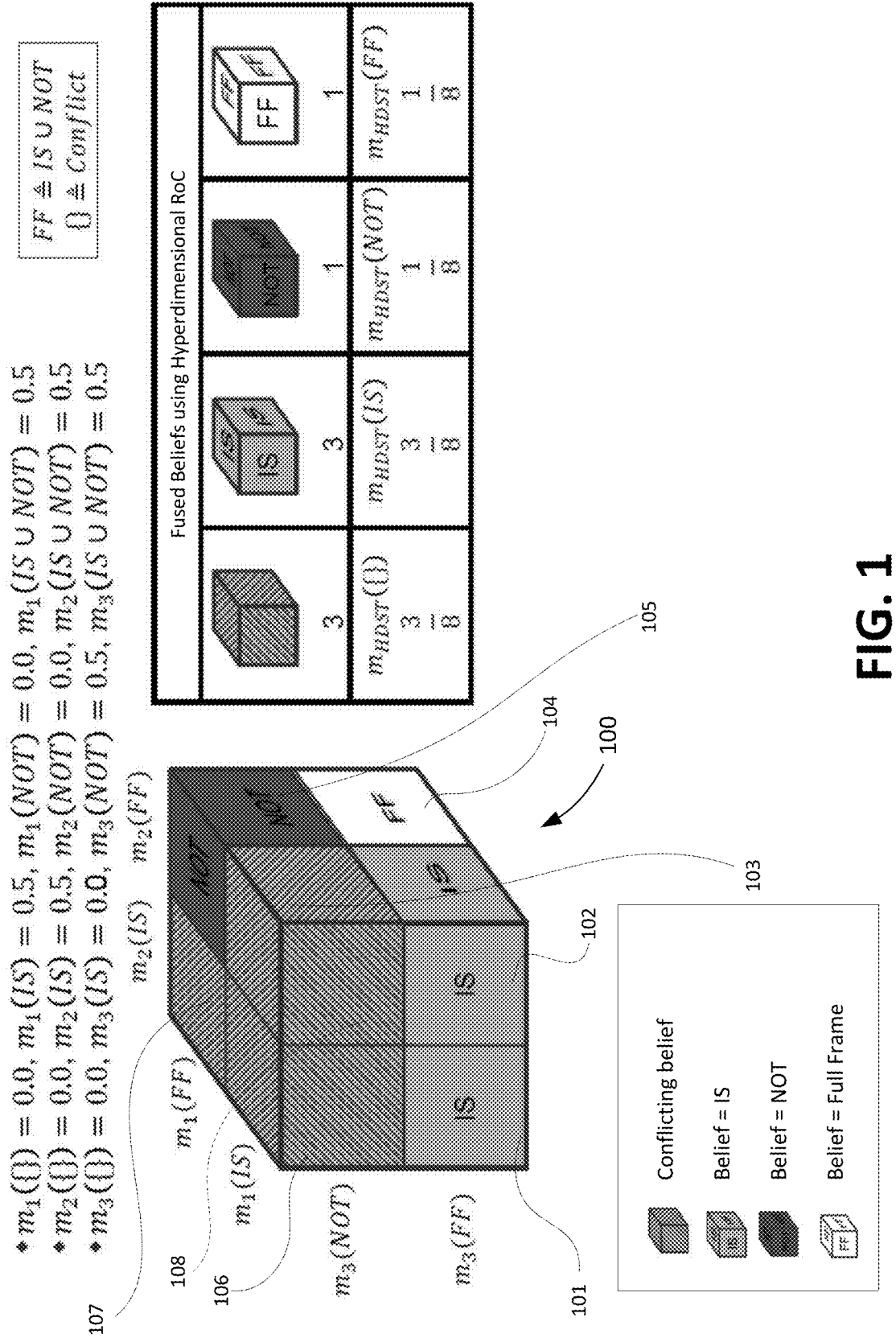
FIG. 1 shows an overview of an example implementation in accordance with aspects of the present disclosure.

Certain embodiments of the disclosure will hereafter be described with reference to the accompanying drawings, wherein like reference numerals denote like elements. It should be understood, however, that the accompanying drawings illustrate only the various implementations described herein and are not meant to limit the scope of various technologies described herein. The drawings show and describe various embodiments of the current disclosure.

The fusing of evidence or belief data (e.g., computer-generated belief data) using DST may involve Rules of Combination (RoC), which is a sequential or ordered process. For example, given three sets of evidence or belief datasets (e.g., $m_1$, $m_2$, and $m_3$), the results of fusing $m_1$, $m_2$, and $m_3$ may be different depending on the order in which the evidence is fused and depending on the RoC used. More specifically, fusing $m_1$ first, $m_2$ second, and $m_3$ third may produce one result, whereas fusing $m_1$ first, $m_3$ second, and $m_2$ third may produce a different result. This issue can be illustrated, given the following evidence sets $m_1$, $m_2$, and $m_3$.

$m_1$ ({ })=0.0, $m_1$ (IS)=0.5, $m_1$ (NOT)=0.0, $m_1$ (IS∪NOT)=0.5

$m_2$ ({ })=0.0, $m_2$ (IS)=0.5, $m_2$ (NOT)=0.0, $m_2$ (IS∪NOT)=0.5

$m_3$ ({ })=0.0, $m_3$ (IS)=0.5, $m_3$ (NOT)=0.5, $m_3$ (IS∪NOT)=0.0

In the above, $m_1$, $m_2$, and $m_3$ represent different evidence sets (also referred to as experts, basic belief assignments (BBAs), or beliefs). Using object identification as an illustrative example, a possible or expected identity of the object may be established (e.g., using any suitable object identification or classification technique), and $m_1$, $m_2$, and $m_3$ represent the different belief datasets associated with the object's predicted identity. The notation ({ }) represents a level of conflict within the evidence set (e.g., the level of conflicting beliefs as to the objects identification), (IS) represents a level or belief that the object is of the expected object, (NOT) represents a level of confidence that the object is not of the expected object, and (IS∪NOT) is a "full frame"

representing the level of confidence that the object is either of the expected object, or not of the expected object (e.g., an uncertainty level or a level of belief that is not committed to any particular outcome). Accordingly, in the $m_1$ evidence set, there is a 0.0 or 0% level of conflict, a belief or confidence 0.5 or 50% that the object is as expected, a 0.0 or 0% belief that the object is not as expected, and a 0.5 or 50% belief that is not committed to any particular outcome.

As described herein, fusing the three belief datasets in different sequential orders may produce different results. Specifically, when using Yager's or DP's RoC and fusing $m_1$ first, $m_2$ second, and $m_3$ third produces the result: $m_{fused}$ ({ })=0.0, $m_{fused}$ (IS)=0.375, $m_{fused}$ (NOT)=0.125, $m_{fused}$ (IS∪NOT)=0.5. However, fusing $m_1$ first, $m_3$ second, and $m_2$ third produces the different result: $m_{fused}$ ({ })=0.0, $m_{fused}$ (IS)=0.5, $m_{fused}$ (NOT)=0.125, $m_{fused}$ (IS∪NOT)=0.375. This inconsistency is problematic as different fused belief results may result in an inconsistency in the execution of applications that use the fused belief results as inputs. As one example, object detection may be inconsistent, conflicting, and/or inaccurate as a result of inconsistent results from belief fusion.

Accordingly, aspects of the present disclosure may include a system and/or method that produces consistent results when fusing belief datasets. In particular, aspects of the present disclosure may incorporate hyperdimensional rules of combination to fuse belief data simultaneously, instead of sequentially, using tensors (or higher dimensional matrices). As such, the associative property no longer applies, and no longer is there a requirement to estimate the correct order when performing data fusion. In this way, consistent results are achieved when fusing belief data from multiple different sources, thereby improving the performance of applications that use fused belief data as inputs.

While the fusion of belief datasets has been described in terms of object detection and identification, in practice, the fusion of belief datasets, described herein, are not so limited. That is, fused belief datasets, that have been fused using the techniques described herein, may be used for any other variety of applications related to or unrelated to object detection and identification.

Embodiments of the disclosure may include a system, a method, and/or a computer program product at any possible technical detail level of integration. The computer program product may include a computer readable storage medium (or media) having computer readable program instructions thereon for causing a processor to carry out aspects of the present disclosure.

FIG. 1 shows an overview of an example implementation in accordance with aspects of the present disclosure. As shown in FIG. 1, and in accordance with aspects of the present disclosure, a three-dimensional tensor 100 may be generated to represent the fusion of belief datasets. In the example shown, the tensor 100 may represent the fusion of the following belief datasets:

$m_1$ ({ })=0.0, $m_1$ (IS)=0.5, $m_1$ (NOT)=0.0, $m_1$ (IS∪NOT)=0.5

$m_2$ ({ })=0.0, $m_2$ (IS)=0.5, $m_2$ (NOT)=0.0, $m_2$ (IS∪NOT)=0.5

$m_3$ ({ })=0.0, $m_3$ (IS)=0.5, $m_3$ (NOT)=0.5, $m_3$ (IS∪NOT)=0.0

In FIG. 1, the notation "FF" is defined as "full-frame" and may be used interchangeably with "IS∪NOT." The tensor 100 may include cubes 101-108 that each represent fused data across different dimensions of the belief datasets. For example, cube 101 represents the fusion of $m_1$ (IS), $m_2$ (IS), and $m_3$ (FF). This fusion translates to a belief of "IS" since the full-frame (FF) datasets do not exclude the IS or NOT datasets, and thus, combining two IS datasets with one FF dataset results in a fused belief of IS. As further shown in FIG. 1, cube 102 represents a fused belief between $m_1$ (FF), $m_2$ (IS), and $m_3$ (FF), which translates to a belief of "IS." Cube 103 represents the fusion of $m_2$ (FF), $m_1$ (IS), and $m_3$ (NOT), which translates to a conflicting belief (i.e., a conflict between $m_1$ (IS) and $m_3$ (NOT)). Cube 104 represents the fusion of $m_2$ (FF), $m_1$ (FF), and $m_3$ (FF), which translates to FF. The remainder of the cubes 105-108 may be generated to represent the fusion between the belief datasets, in similar manner as described above. In this way, the beliefs may be fused simultaneously using hyperdimensional rules of combination (RoC) without consideration to the order of the fusing.

In some embodiments, the fused beliefs from the tensor 100 may be summarized in a chart format as shown in FIG. 1, and the cubes 101-108 may be tallied to identify the aggregate results of the fused belief datasets. In the example shown, ⅜ of the result represents a conflicting belief, ⅜ represents the IS belief, ⅛ represents the NOT belief, and ⅛ represents an uncertain belief (e.g., the full-frame) belief.

As described herein, the tensor 100 may include an accumulation of eight cubes, although additional cubes may be present when fusing more than the three example belief datasets described herein, or more combinations of hypotheses than simply (IS) and (NOT). In other words, the techniques described herein are not limited to fusing only three belief datasets or only (IS) and (NOT) hypotheses, and thus, the tensor is not limited to including only eight cubes. That is, the tensor 100 shown is purely an illustrative example provided for simplicity in describing the details of an embodiment of the disclosure.

The tensor 100 may be constructed by a hyperdimensional fusing system as described in greater detail herein. For example, the hyperdimensional fusing system may receive the belief datasets (also referred to as "experts"), and generate an initialized final result tensor in an initial state (e.g., a full-frame tensor). In the initial state, the location of each belief dataset may be randomized. That is, with consideration to the example shown in FIG. 1, each of $m_1$ (FF), $m_1$ (IS), $m_3$ (FF), $m_3$ (NOT), $m_2$ (IS), $m_2$ (FF), may be present at different dimensional locations than that shown in the tensor 100 in FIG. 1.

In some embodiments, for example, the hyperdimensional fusing system may create an expert tensor for each belief dataset, fuse each expert tensor into the final result tensor, and arrange the final result tensor in order of focals or results. For example, the fused expert tensors (e.g., represented by each cube in tensor 100) may be arranged and grouped by beliefs such that tensors representing of the same or common belief are grouped together (e.g., similar to the final tensor 100 shown in FIG. 1). The arranged final results tensor, such as the tensor 100 shown in FIG. 1, may be converted to a BBA array, and may be stored or outputted for use as an input to an application by a fused belief data application server. For example, the fused belief data application server may host an object detection application that uses the fused belief data as an input in generating predictions or estimates as to the identification of an object. Additionally, or alternatively, the fused belief dataset may be provided to a conflict resolution system to resolve the conflicts identified in the tensor 100. In some embodiments, the tensor 100 may be visually presented (e.g., to a user).

Figure 2:
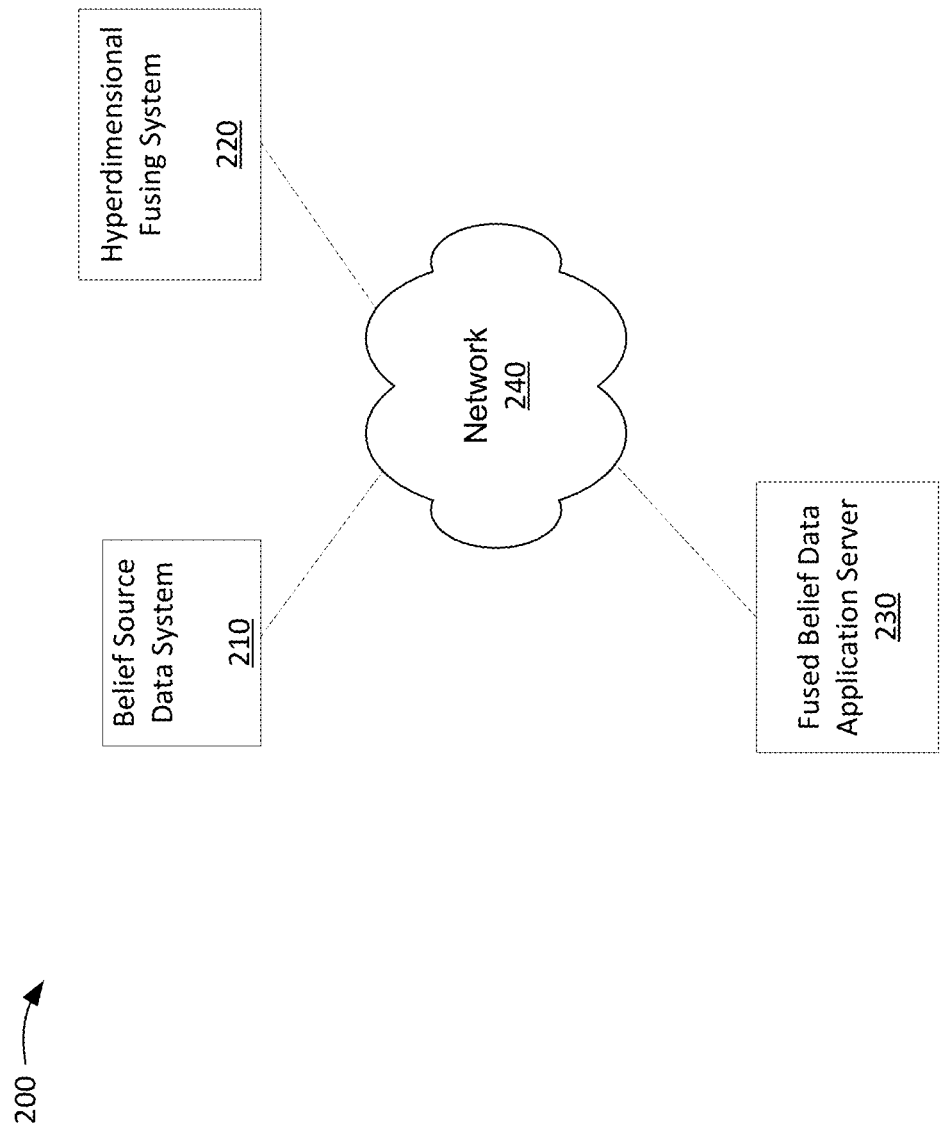
FIG. 2 shows an example environment in accordance with aspects of the present disclosure.

FIG. 2 shows an example environment in accordance with aspects of the present disclosure. As shown in FIG. 2, environment 200 includes a belief source data system 210, a hyperdimensional fusing system 220, a fused belief data application server 230, and a network 240.

The belief source data system 210 may include one or more computing devices or application servers that hosts an application that provides computer-generated belief data (e.g., "expert information"). As one illustrative example, the belief source data system 210 may host an object identification application in which the belief source data system 210 may generate belief data based on input data (e.g., an image, video, sensor data, ultrasound data, sonar data, or the like). In this example, the belief data, generated by the belief source data system 210, may include object identification estimations or classifications (e.g., probabilities and confidence levels as to an object's identity or classification). Additionally, or alternatively, the belief source data system 210 may be any other variety of applications and provide belief data associated with these applications, including AI applications, or the like. In some embodiments, the belief data may correspond to expert datasets and/or basic belief assignments (BBAs).

The hyperdimensional fusing system 220 may include one or more computing devices that fuses different expert or belief datasets generated by the belief source data system 210. As described herein, the hyperdimensional fusing system 220 may fuse the belief datasets simultaneously using tensors, without consideration to the order of fusion. As such, the hyperdimensional fusing system 220 may produce more consistent fused belief datasets in relation to when data fusion is performed in a particular order. In some embodiments, the hyperdimensional fusing system 220 may output the fused belief dataset to the fused belief data application server 230.

The fused belief data application server 230 may include one or more computing devices that hosts an application that processes fused belief data (e.g., generated by and received from the hyperdimensional fusing system 220). As one illustrative example, the fused belief data application server 230 may host an object identification application that receives fused expert data corresponding to the fusion of different expert beliefs regarding the identity of an object. Based on receiving this fused expert data, the fused belief data application server 230 may generate estimations as to the identity of the object or trigger decisions or actions to be taken by the system as a whole. In some embodiments, the functions of the fused belief data application server 230 may be integrated with the belief source data system 210, or may function as a separate entity.

The network 240 may include network nodes, one or more wired and/or wireless networks. For example, the network 240 may include a cellular network (e.g., a second generation (2G) network, a third generation (3G) network, a fourth generation (4G) network, a fifth generation (2G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 240 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks. In embodiments, the network 240 may include copper transmission cables, optical transmission fibers, wireless transmission, routers, firewalls, switches, gateway computers and/or edge servers.

The quantity of devices and/or networks in the environment 200 is not limited to what is shown in FIG. 2. In practice, the environment 200 may include additional devices and/or networks; fewer devices and/or networks; different devices and/or networks; or differently arranged devices and/or networks than illustrated in FIG. 2. Also, in some implementations, one or more of the devices of the environment 200 may perform one or more functions described as being performed by another one or more of the devices of the environment 200. Devices of the environment 200 may interconnect via wired connections, wireless connections, or a combination of wired and wireless connections.

Figure 3:
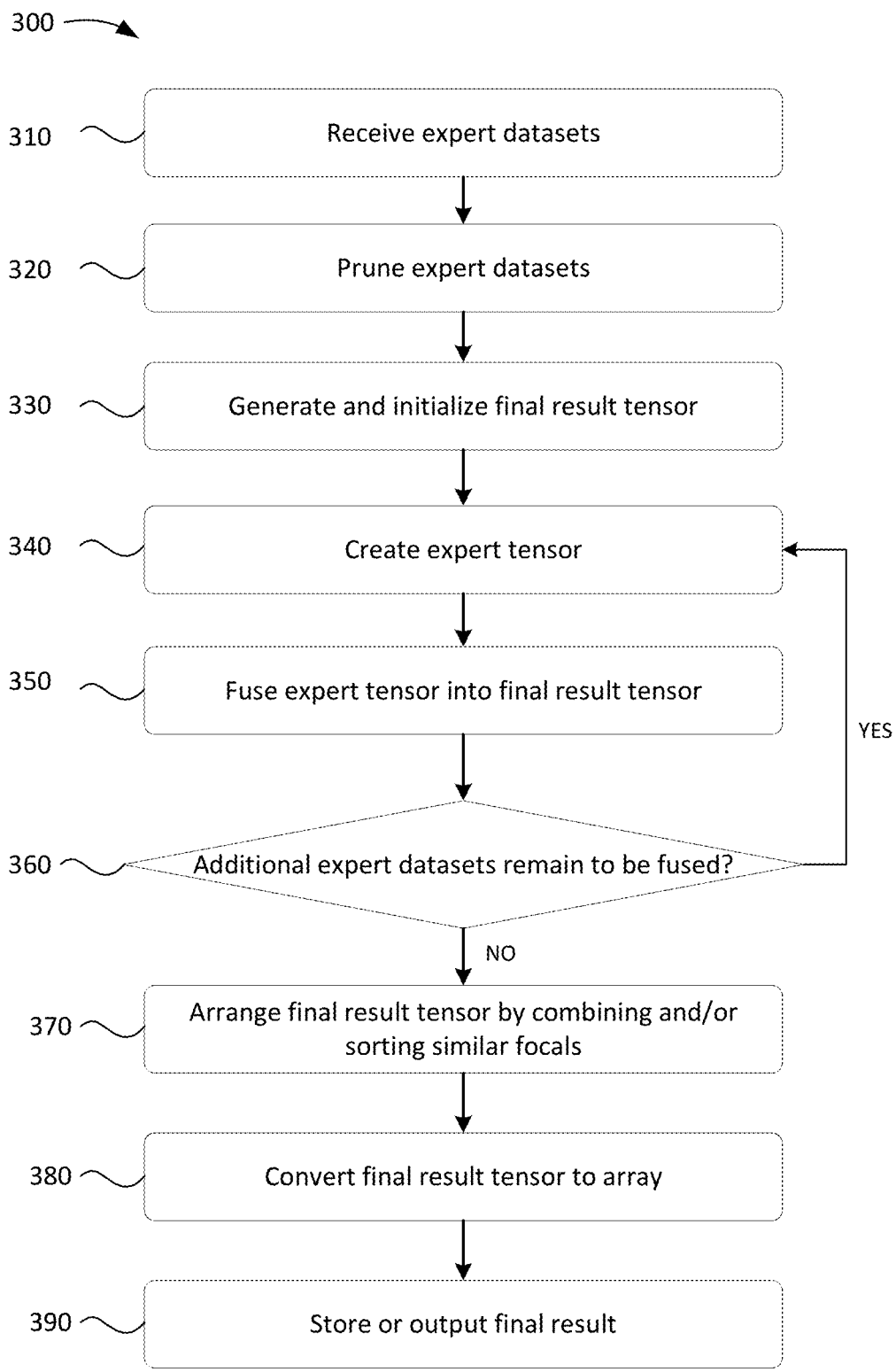
FIG. 3 shows an example flowchart of a process for fusing multiple different expert datasets using a hyperdimensional fusing technique, described herein.

FIG. 3 shows an example flowchart of a process for fusing multiple different expert datasets using a hyperdimensional fusing technique, described herein. The steps of FIG. 3 may be implemented in the environment of FIG. 2, for example, and are described using reference numbers of elements depicted in FIG. 2. As noted above, the flowchart illustrates the architecture, functionality, and operation of possible implementations of systems, methods, and computer program products according to various embodiments of the present disclosure.

As shown in FIG. 3, process 300 may include receiving expert datasets (block 310). For example, the hyperdimensional fusing system 220 may receive expert datasets (or belief datasets) from the belief source data system 210. As one illustrative example, the belief source data system 210 may host an object identification application in which the belief source data system 210 may generate expert datasets based on an input image or video. The hyperdimensional fusing system 220 may receive these expert datasets for fusing.

Process 300 also may include pruning the expert datasets (block 320). For example, the hyperdimensional fusing system 220 may prune, down select, and/or discard one or more of the expert datasets (e.g., received at block 310). In some embodiments, the hyperdimensional fusing system 220 may discard expert datasets having only full-frame data. For example, in the case of object identification, a full-frame dataset, such as: $m_1$ (IS∪NOT)=1.0, would not provide any insight or reliable estimate as to whether the identification of an input image is or is not of an estimated object.

Process 300 further may include generating and initializing a final result tensor (block 330). For example, the hyperdimensional fusing system 220 may generate a final result tensor, similar to the tensor 100 shown in FIG. 1, but initially populated and initialized with full frame values.

Process 300 also may include creating an expert tensor (block 340). For example, each remaining expert dataset (e.g., of the pruned expert datasets after block 320) may be represented on an axis of the final result tensor, and an expert tensor (e.g., a cube on the tensor). The expert tensor may initially be represented as a full frame.

Process 300 further may include fusing the expert tensor into the final result tensor (block 350). For example, the hyperdimensional fusing system 220 may fuse the expert tensor into the final result tensor in which the fused tensor may include a cube on the final result tensor and an indication of the fused belief represented by the fused tensor. An example of a fused expert tensor may include any of blocks 101-108 on the tensor 100 of FIG. 1.

Process 300 also may include determining if additional expert datasets remain to be fused (block 360). If additional expert datasets remain to be fused (block 360—YES), process 300 may return to block 340 and 350. Blocks 340 and 350 may be repeated until all expert tensors have been generated and fused into the final result tensor. As an illustrative example in conjunction with the tensor 100 of FIG. 1, blocks 340 and 350 may be repeated until all of blocks 101-108 have been generated with an indication of the fused expert datasets. At this point, the final result tensor contains the fused expert datasets received except those pruned at blocks 310 and 320.

Process 300 further may include arranging the final result tensor by combining and/or sorting similar focals (block 370). For example, the hyperdimensional fusing system 220 may arrange the final result tensor such that similar focals or fused beliefs are grouped together in common locations. As an illustrative example, the hyperdimensional fusing system 220 may arrange the cubes on the final result tensor similar to that shown by tensor 100 in FIG. 1.

Process 300 may also include converting the final result tensor to an array (block 380). For example, the hyperdimensional fusing system 220 may convert the final result tensor to an array using any suitable tensor to array conversion technique so that the fused result may be represented as a data set format equivalent to the format received by the experts (e.g., at block 310). In some embodiments, the final result represented as a data set format equivalent to the format received by the experts may facilitate or improve the performance of application that uses the final result tensor.

Process 300 further may include storing or outputting the final result (block 390). In some embodiments, the final result may be stored and/or outputted after completion of blocks 340-360 and once all expert datasets have been fused. That is, blocks 370 and 380 may be omitted, and the final result may be stored and/or outputted without rearranging and/or converting to an array. In some embodiments, the final result may include a final result tensor, representing the fused expert datasets may be used by the fused belief data application server 230 as an input for an application (e.g., object detection/identification application). In some embodiments, the final result may be outputted and displayed in the form of an array, or graphical image, such as the tensor as shown in FIG. 1.

Figure 4:
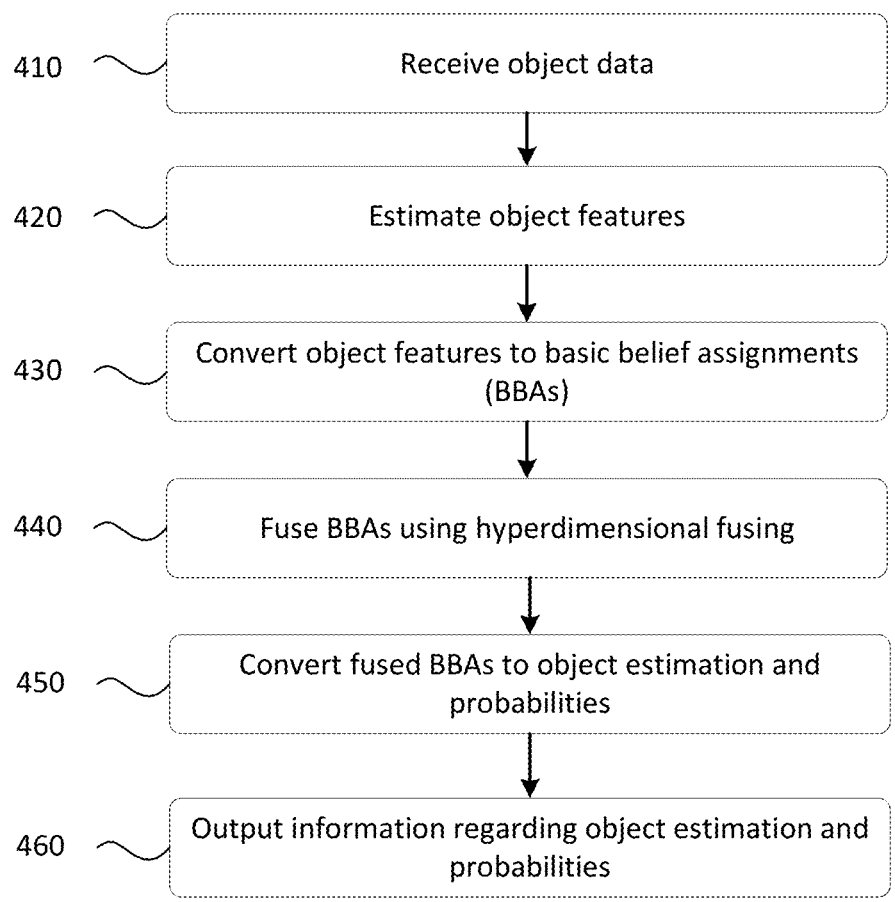
FIG. 4 shows an example flowchart of a process for identifying an object from an input image based on fusing multiple belief assignments using the hyperdimensional fusing technique described herein.

FIG. 4 shows an example flowchart of a process for identifying an object from an input image based on fusing multiple belief assignments using the hyperdimensional fusing technique described herein. The blocks of FIG. 4 may be implemented in the environment of FIG. 4, for example, and are described using reference numbers of elements depicted in FIG. 4. As noted above, the flowchart illustrates the architecture, functionality, and operation of possible implementations of systems, methods, and computer program products according to various embodiments of the present disclosure.

As shown in FIG. 4, process 400 may include receiving object data (block 410). For example, the belief source data system 210 may receive object data, such as an input image, video, sensor data, radar data, sonar data, etc.

Process 400 also may include estimating the object features (block 420). For example, the belief source data system 210 may initially estimate the object features using any object feature recognition technique (e.g., pixel-based classification, machine learning, neural network application, or the like).

Process 400 further may include converting the object features to basic belief assignments (BBAs) (block 430). For example, the belief source data system 210 may convert the object features to BBAs in which the BBAs represent different expert datasets having confidence levels as to the object's identity.

Process 400 also may include fusing the BBAs using hyperdimensional fusing (block 440). For example, the hyperdimensional fusing system 220 may receive the BBAs from the belief source data system 210, and fuse the BBAs using the hyperdimensional fusing technique (e.g., corresponding to process 300 of FIG. 3). In this way, the BBAs are fused simultaneously without the drawbacks of order or sequence-based fusing. In some embodiments, the fused BBAs may include a final result tensor and/or an array representing the final result tensor.

Process 400 further may include converting the fused BBAs to object estimation and probabilities (block 450). For example, the fused belief data application server 230 may receive the fused BBAs (e.g., the final result tensor and/or the array representing the final result tensor), and convert the fused BBAs to object estimation and probabilities. That is, the fused belief data application server 230 may apply the fused BBAs for estimating the object's identity, and the probabilities/confidence that the estimation is correct. As such, the fused BBAs are used to improve the probabilities and confidence that the estimation is correct. Further, since the BBAs are fused simultaneously, without consideration to sequence, the fused result is more accurate and consistent in relation to when the BBAs are fused in different sequences. Accordingly, the performance of any application (such as an object identification application) using the fused BBAs as an input is improved.

Process 400 also may include (block 460). For example, the fused belief data application server 230 may output information regarding the object estimation and probabilities. In some embodiments, the fused belief data application server 230 may output the information in the form of a table, chart, or other format.

While different portions of the process 400 of FIG. 4 is described as being performed by multiple different components (e.g., the belief source data system 210, the hyperdimensional fusing system 220, and the fused belief data application server 230), in practice, all blocks of the process 400 may be performed by one device. Also, one block being performed by one device may be performed by a different device.

Figure 5:
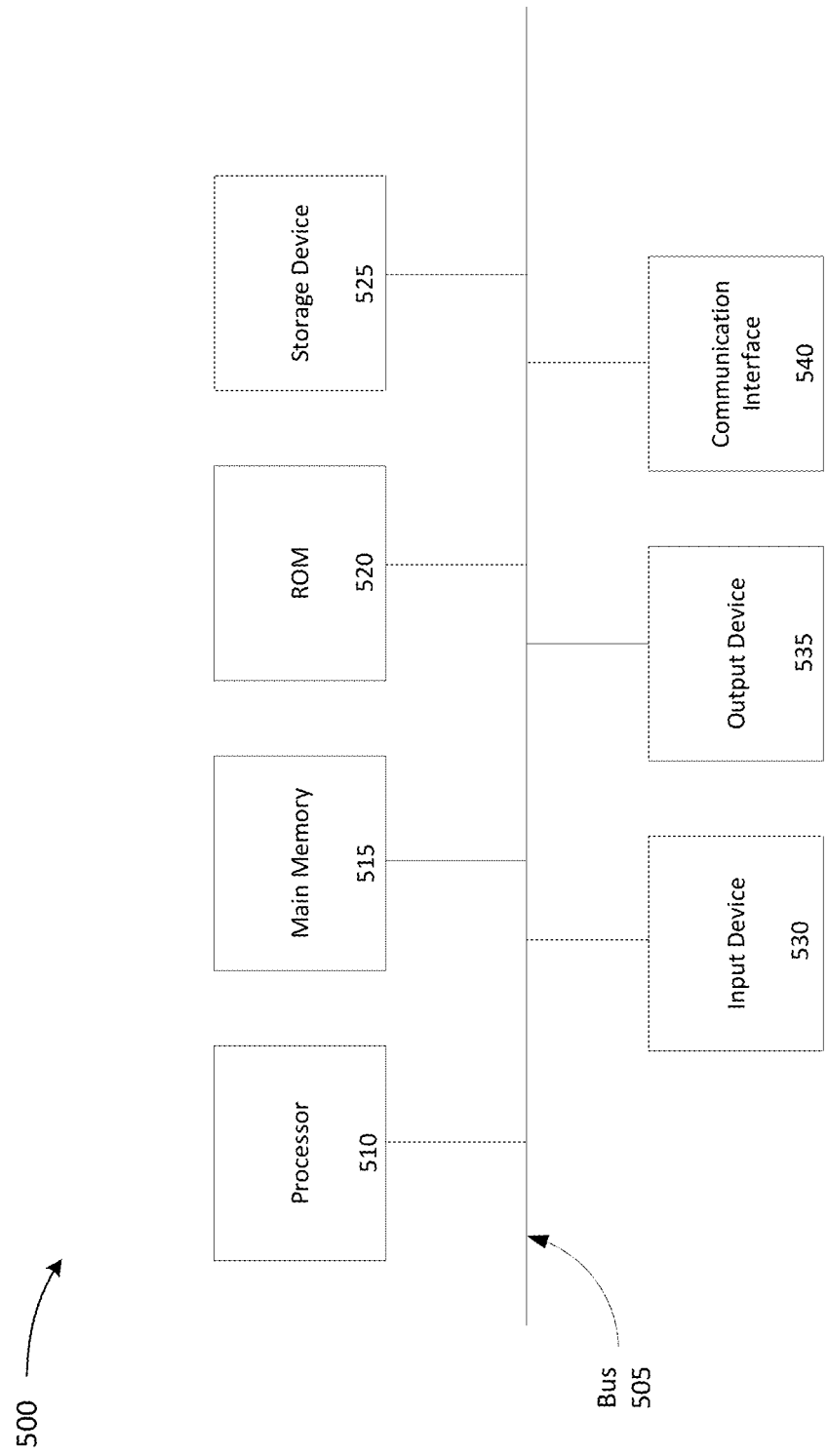
FIG. 5 illustrates example components of a device that may be used within the environment of FIG. 2

FIG. 5 illustrates example components of a device 500 that may be used within environment 200 of FIG. 2. Device 500 may correspond to the belief source data system 210, the hyperdimensional fusing system 220, and/or the fused belief data application server 230 and may include one or more devices 500 and/or one or more components of device 500.

As shown in FIG. 5, device 500 may include a bus 505, a processor 510, a main memory 515, a read only memory (ROM) 520, a storage device 525, an input device 530, an output device 535, and a communication interface 540.

Bus 505 may include a path that permits communication among the components of device 500. Processor 510 may include a processor, a microprocessor, an application specific integrated circuit (ASIC), a field programmable gate array (FPGA), or another type of processor that interprets and executes instructions. Main memory 515 may include a random access memory (RAM) or another type of dynamic storage device that stores information or instructions for execution by processor 510. ROM 520 may include a ROM device or another type of static storage device that stores static information or instructions for use by processor 510. Storage device 525 may include a magnetic storage medium, such as a hard disk drive, or a removable memory, such as a flash memory.

Input device 530 may include a component that permits an operator to input information to device 500, such as a control button, a keyboard, a keypad, or another type of input device. Output device 535 may include a component that outputs information to the operator, such as a light emitting diode (LED), a display, or another type of output device. Communication interface 540 may include any transceiver-like component that enables device 500 to communicate with other devices or networks. In some implementations, communication interface 540 may include a wireless interface, a wired interface, or a combination of a wireless interface and a wired interface. In embodiments, communication interface 540 may receiver computer readable program instructions from a network and may forward the computer readable program instructions for storage in a computer readable storage medium (e.g., storage device 525).

Device 500 may perform certain operations, as described in detail below. Device 500 may perform these operations in response to processor 510 executing software instructions contained in a computer-readable medium, such as main memory 515. A computer-readable medium may be defined as a non-transitory memory device and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. A memory device may include memory space within a single physical storage device or memory space spread across multiple physical storage devices.

The software instructions may be read into main memory 515 from another computer-readable medium, such as storage device 525, or from another device via communication interface 540. The software instructions contained in main memory 515 may direct processor 510 to perform processes that will be described in greater detail herein. Alternatively, hardwired circuitry may be used in place of or in combination with software instructions to implement processes described herein. Thus, implementations described herein are not limited to any specific combination of hardware circuitry and software.

In some implementations, device 500 may include additional components, fewer components, different components, or differently arranged components than are shown in FIG. 5.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or or other devices to function in a particular manner, such that the computer readable storage medium having instructions stored therein comprises an article of manufacture including instructions which implement aspects of the function/act specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may include a system, a method, and/or a computer program product at any possible technical detail level of integration. The computer program product may include a computer readable storage medium (or media) having computer readable program instructions thereon for causing a processor to carry out or execute aspects and/or processes of the present disclosure.

In embodiments, the computer readable program instructions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on a user's computer, partly on the user's computer, as a stand-alone software package, partly on the user's computer and partly on a remote computer or entirely on the remote computer or server.

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In embodiments, a service provider could offer to perform the processes described herein. In this case, the service provider can create, maintain, deploy, support, etc., the computer infrastructure that performs the process steps of the disclosure for one or more customers. These customers may be, for example, any business that uses technology. In return, the service provider can receive payment from the customer(s) under a subscription and/or fee agreement and/or the service provider can receive payment from the sale of advertising content to one or more third parties.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While the present disclosure has been disclosed with respect to a limited number of embodiments, those skilled in the art, having the benefit of this disclosure, will appreciate numerous modifications and variations there from. It is intended that the appended claims cover such modifications and variations as fall within the true spirit and scope of the disclosure.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A computer-implemented method comprising:
   receiving a plurality of expert datasets representing computer-generated beliefs;
   generating respective expert tensors for each expert dataset;
   simultaneously fusing each of the respective expert tensors into a final result tensor using hyperdimensional rules of combination such that an associative property does not apply and there is no requirement to estimate an order when performing the fusion, wherein the final result tensor represents a fusing of the plurality of expert datasets, and wherein a first portion of the final result tensor has conflict;
   performing conflict management for the first portion of the final result tensor; and
   storing or outputting a final result of the simultaneous fusing and the conflict management for use in an application.

2. The method of claim 1, wherein the simultaneously fusing is performed without regard to a sequence of fusing the plurality of expert datasets.

3. The method of claim 1, further comprising pruning the plurality of expert datasets to eliminate a subset of the plurality of expert datasets having only full-frame belief data.

4. The method of claim 1, further comprising converting the final result tensor into an array, wherein the array is stored or output for use in the application.

5. The method of claim 1, further comprising arranging the final result tensor prior to storing or outputting the final result.

6. The method of claim 5, wherein the arranging comprises grouping cubes of the final result tensor by common belief.

7. The method of claim 1, wherein storing or outputting the final result tensor comprises outputting the final result tensor to an object identification application.

8. The method of claim 7, wherein the object identification application generates an estimation of the object based on the fused plurality of expert datasets.

9. The method of claim 1, wherein storing or outputting includes outputting a graphical representation of the final result tensor.

10. A non-transitory memory device having program instructions embodied therewith, the program instructions being executable by a computing device to cause the computing device to perform operations comprising:
    receiving a plurality of expert datasets representing computer-generated beliefs;
    generating respective expert tensors for each expert dataset;
    simultaneously fusing each of the respective expert tensors into a final result tensor using hyperdimensional rules of combination such that an associative property does not apply and there is no requirement to estimate an order when performing the fusion, wherein the final result tensor represents a fusing of the plurality of expert datasets, and wherein a first portion of the final result tensor has conflict;
    performing conflict management for the first portion of the final result tensor; and
    storing or outputting the final result tensor and the conflict management for use in an application.

11. The non-transitory memory device of claim 10, wherein the simultaneously fusing is performed without regard to a sequence of fusing the plurality of expert datasets.

12. The non-transitory memory device of claim 10, wherein the operations further comprise pruning the plurality of expert datasets to eliminate a subset of the plurality of expert datasets having only full-frame belief data.

13. The non-transitory memory device of claim 10, wherein the operations further comprise converting the final result tensor into an array, wherein the array is stored or output for use in the application.

14. The non-transitory memory device of claim 10, wherein the operations further comprise arranging the final result tensor by grouping cubes of the final result tensor by common belief prior to storing or outputting the final result tensor.

15. The non-transitory memory device of claim 10, wherein storing or outputting the final result tensor comprises outputting the final result tensor to an object identification application.

16. The non-transitory memory device of claim 15, wherein the object identification application generates an estimation of the object based on the fused plurality of expert datasets.

17. A system comprising:
a processor, a computer readable memory, a non-transitory computer readable storage medium associated with a computing device, and program instructions executable by the computing device to cause the computing device to perform operations comprising:
receiving a plurality of expert datasets representing computer-generated beliefs;
generating respective expert tensors for each expert dataset;
simultaneously fusing each of the respective expert tensors into a final result tensor using hyperdimensional rules of combination such that an associative property does not apply and there is no requirement to estimate an order when performing the fusion, wherein the final result tensor represents a fusing of the plurality of expert datasets, and wherein a first portion of the final result tensor has conflict;
performing conflict management for the first portion of the final result tensor; and
storing or outputting the final result tensor and the conflict management for use in an application.

18. The system of claim 17, wherein the simultaneously fusing is performed without regard to a sequence of fusing the plurality of expert datasets.

19. The system of claim 17, wherein the operations further comprise pruning the plurality of expert datasets to eliminate a subset of the plurality of expert datasets having only full-frame belief data.

20. The system of claim 17, wherein the operations further comprise converting the final result tensor into an array, wherein the array is stored or output for use in the application.

21. The method of claim 1, wherein a second portion of the final result tensor is conflict-free.

22. The method of claim 21, wherein the conflict management is not performed on the second portion of the final result tensor.

23. The method of claim 1, wherein the plurality of expert datasets is received in an initial state where a location of each expert dataset is randomized, and wherein the expert datasets represent the computer-generated beliefs.

24. The method of claim 1, wherein each of the respective expert tensors comprises a cube on the final result tensor and serves as an indication of a fused belief represented by the respective expert tensor, and wherein the method further comprises arranging the final result tensor in an order of focals or results.

25. The method of claim 1, wherein the computer-generated beliefs are based on object data, wherein the object data comprises an image, a video, sensor data, or a combination thereof, and wherein the method further comprises:
estimating an identity of an object in the object data based at least partially upon the final result tensor; and
determining a probability that the estimation is correct based at least partially upon the final result tensor.

* * * * *